(12) United States Patent
Huang et al.

(10) Patent No.: US 7,540,474 B1
(45) Date of Patent: Jun. 2, 2009

(54) UV STERILIZING HUMIDIFIER

(76) Inventors: Chuan-Pan Huang, No. 17, Hsinjen Rd., Tainan City (TW); Chen-Lung Huang, No. 17, Hsinjen Rd., Tainan City (TW)

( * ) Notice: Subject to any disclaimer, the term of this patent is extended or adjusted under 35 U.S.C. 154(b) by 0 days.

(21) Appl. No.: 12/014,567

(22) Filed: Jan. 15, 2008

(51) Int. Cl.
*B01F 3/04* (2006.01)

(52) U.S. Cl. ............... 261/81; 261/DIG. 48; 422/24

(58) Field of Classification Search .............. 261/1, 261/81, DIG. 48; 422/24; 392/393, 394, 392/397, 405, 406
See application file for complete search history.

(56) References Cited

U.S. PATENT DOCUMENTS

| | | | |
|---|---|---|---|
| 4,087,495 A * | 5/1978 | Umehara | 261/81 |
| 4,257,989 A * | 3/1981 | Nishikawa | 261/4 |
| 4,630,475 A * | 12/1986 | Mizoguchi | 73/293 |
| 4,644,790 A * | 2/1987 | Mizoguchi | 73/293 |
| 4,708,826 A * | 11/1987 | Mizoguchi | 261/30 |
| 4,719,057 A * | 1/1988 | Mizoguchi | 261/81 |
| 5,677,982 A | 10/1997 | Levine et al. | 395/405 |
| 5,859,952 A | 1/1999 | Levine et al. | 392/405 |
| 6,793,205 B2 * | 9/2004 | Eom | 261/142 |
| 7,219,880 B2 * | 5/2007 | Huang et al. | 261/72.1 |
| 7,362,964 B2 * | 4/2008 | Wang | 392/405 |
| 2006/0237860 A1 * | 10/2006 | Huang et al. | 261/81 |

FOREIGN PATENT DOCUMENTS

JP 3-251625 A * 11/1991 ......... 261/DIG. 48

* cited by examiner

*Primary Examiner*—Richard L Chiesa
(74) *Attorney, Agent, or Firm*—J.C. Patents

(57) ABSTRACT

A UV sterilizing humidifier includes a water box body provided with a water-storing box bored with a water inlet fixed with a first silica tube connected with one end of a glass tube having another end connected with a second silica tube, which is connected with the inlet tube of the water-storing tank of a main body. The water box body is installed with a UV sterilizing lamp positioned under the glass tube and having its circumference provided with an isolating layer for preventing UV light from transmitting to the outer environment. The water box body further has an atomization chamber for receiving atomized substance. A main body is disposed with a water-storing tank for storing a proper amount of water, an oscillator for atomizing the water inside and a detecting element for detecting the water amount therein for insuring safety of using the humidifier.

9 Claims, 6 Drawing Sheets

UV STERILIZING HUMIDIFIER

BACKGROUND OF THE INVENTION

1. Field of the Invention

This invention relates to a UV sterilizing humidifier, particularly to one including a water box body provided with a water-storing box having a lower side bored with a water outlet fixed with a first tube connected with one end of a UV transparent tube having the other end connected with a second tube, which is connected with the outlet tube of a water-storing tank of a main body. The water box body is installed with a UV sterilizing lamp at a location under the UV transparent tube. By so designing, when the water in the water-storing box flows through the UV transparent tube and before getting into the water-storing tank of the main body, it will be compulsively sterilized by the UV sterilizing lamp in the water box; therefore, atomized substance conveyed into a room becomes absolutely clean.

2. Description of the Prior Art

A conventional humidifier, disclosed in U.S. Pat. Nos. 5,677,982 and 5,859,952 shown in FIG. 7, includes a base provided with a water-storing chamber 40. The water in the water-storing chamber 40 flows to a sterilizing chamber 42 through the aperture 41' of a first partition 41 to be sterilized by a UV sterilizing lamp 43 at the lower side of the sterilizing chamber 42. Subsequently, the sterilized water flows into a compartment 46 through the aperture 45' of a second partition 45 and then is conveyed to a heating chamber through a pipe 47 to be heated therein.

However, the foresaid conventional humidifier is a heating-atomizing humidifier that needs to have water heated to reach a boiling point for producing vapor whose high temperature can directly carry out sterilization; therefore, the UV sterilizing lamp seems unnecessary to be additionally provided in the heating-atomizing humidifier.

In addition, the UV sterilizing lamp cannot quickly sterilize the water stored in the sterilizing chamber and since the water in the sterilizing chamber is of large quantity, it must take much more time to sterilize the water completely; otherwise, parts of bacteria may remain therein.

SUMMARY OF THE INVENTION

A first objective of this invention is to offer a UV sterilizing humidifier including a water box body installed therein with a UV sterilizing lamp, which can be removed together with the water box body for insuring safety in installation.

A second objective of this invention is to offer a UV sterilizing humidifier provided with a UV sterilizing lamp for directly carrying out sterilization when water in the water-storing box of the water box body flows through a UV transparent tube and before getting into the water-storing tank of a main body, insuring the atomized substance produced by an oscillator and conveyed into a room to be aseptic.

One feature of the UV sterilizing humidifier in the present invention includes a water box body provided with a water-storing box having its bottom bored with a water outlet fixed with a first tube connected with one end of a UV transparent tube having the other end connected with a second tube, which is connected with the inlet tube of the water-storing tank of a main body. Preferably, the first and second tube is made of a heat-resistant material, such as silica or other suitable materials. The UV transparent tube can be made of glass or other suitable materials as long as UV light can be transmitted therethrough. The water box body is installed with a UV sterilizing lamp at a location under the glass tube; therefore, when the water in the water-storing box flows through the UV transparent tube and before getting into a room, it can be compulsively sterilized by the UV sterilizing lamp.

Another feature of the UV sterilizing humidifier in the present invention includes a main body provided with a water-storing tank having a proper amount of water stored in the interior and having an oscillator installed therein for atomizing the water in the water-storing tank. Then, atomized substance is conveyed into a room through an atomization chamber of the water box body.

The main body is further provided with an inversion oscillating circuit connected with an emitting induction coil.

The water box body is disposed inside with a control circuit provided with a rectifying-filtering circuit, a conduction control circuit, a functional unit and a receiving induction coil. The receiving induction coil receives electromagnetic field produced by the emitting induction coil of the main body and has its opposite ends producing voltage for triggering the control circuit of the water box body to operate.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
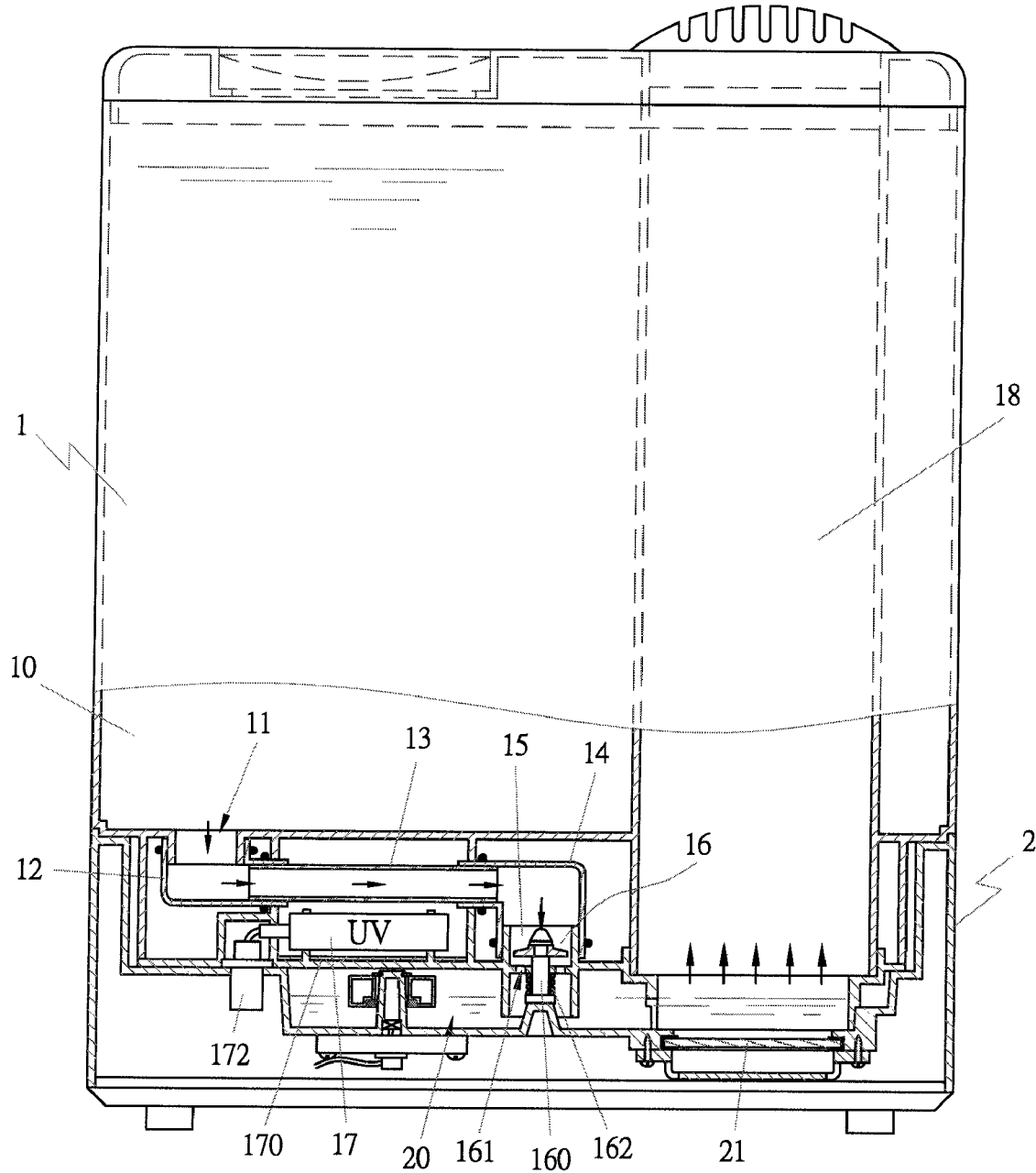
FIG. 1 is a partial cross-sectional view of a first preferred embodiment of a UV sterilizing humidifier in the present invention.
Figure 2:
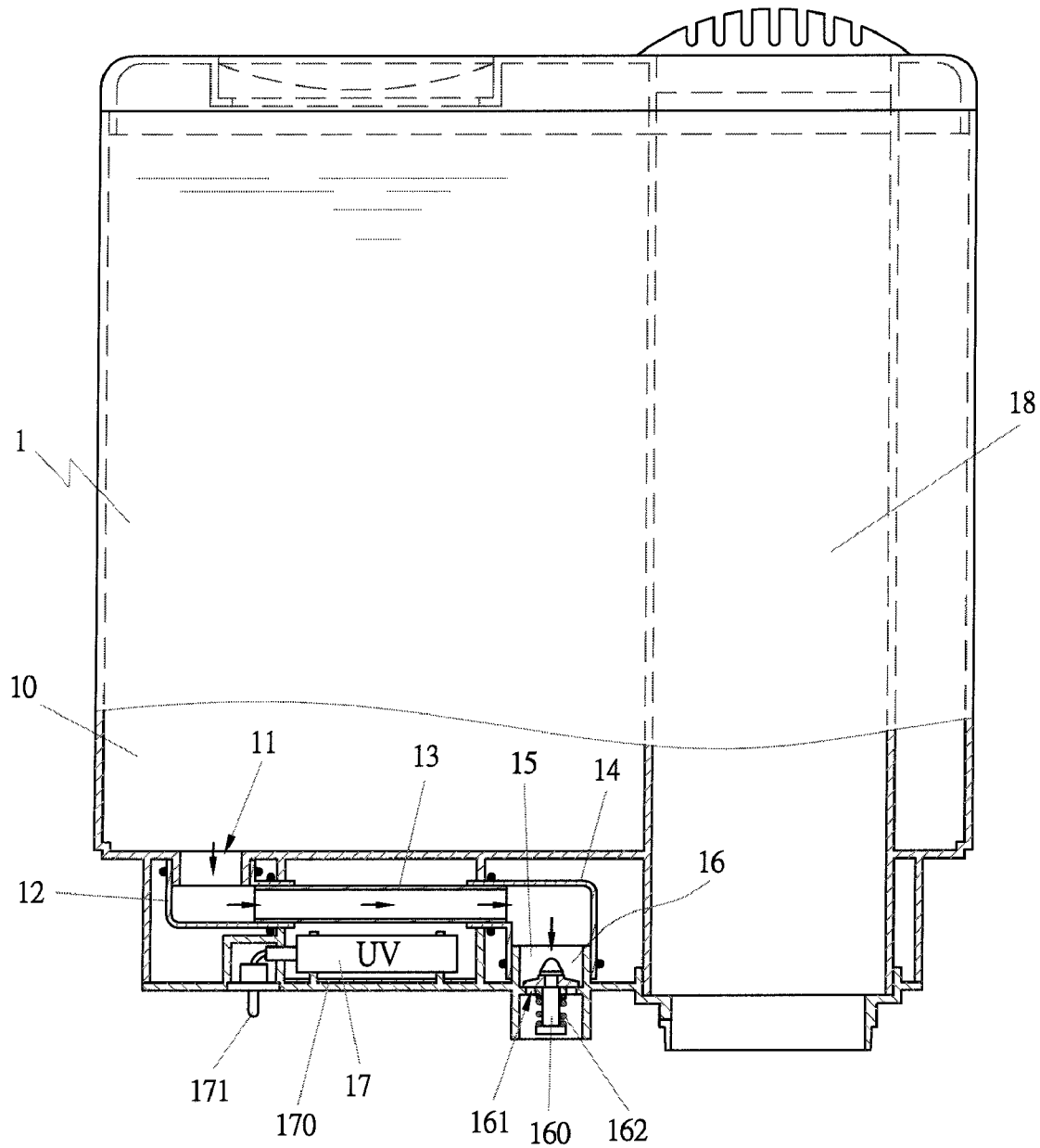
FIG. 2 is a partial cross-sectional view of the first preferred embodiment of the water box body of the UV sterilizing humidifier in the present invention.

A first preferred embodiment of a UV sterilizing humidifier in the present invention, as shown in FIGS. 1 and 2, includes a water box body 1 and a main body 2 as main components combined together.

The water box body 1 is provided with a water-storing box 10 having its lower side bored with a water outlet 11 fixed with a first heat-resistant tube 12 connected with one end of a glass tube 13 having the other end connected with a second heat-resistant tube 14, which has the other end connected with the inlet tube 15 of a water-storing tank of the main body 2. The inlet tube 15 is formed integrally with the water box body 1 and provided with a control valve 16 having its valve rod 160 under a water inlet 161 fitted thereon with a compression elastic member 162. When the water box body 1 is separated from the main body 2, the control valve 16 will be pulled downward by the compression elastic member 162 to close the water inlet 161 below for preventing water in the water-storing box 10 from leaking out.

Referring to FIG. 2, the water box body 1 is installed with a UV sterilizing lamp 17 at a location under the UV transparent tube 13. The UV sterilizing lamp 17 has its circumference, except a portion facing the UV transparent tube 13, disposed with an isolating layer 170 for separating the UV sterilizing lamp 17 from the outside so as to prevent UV light from transmitting to the environment around. The UV sterilizing lamp 17 is provided with a conducting terminal 171 connected with a connecting terminal 172 of the main body 2 for carrying out electrical connection.

Figure 3:
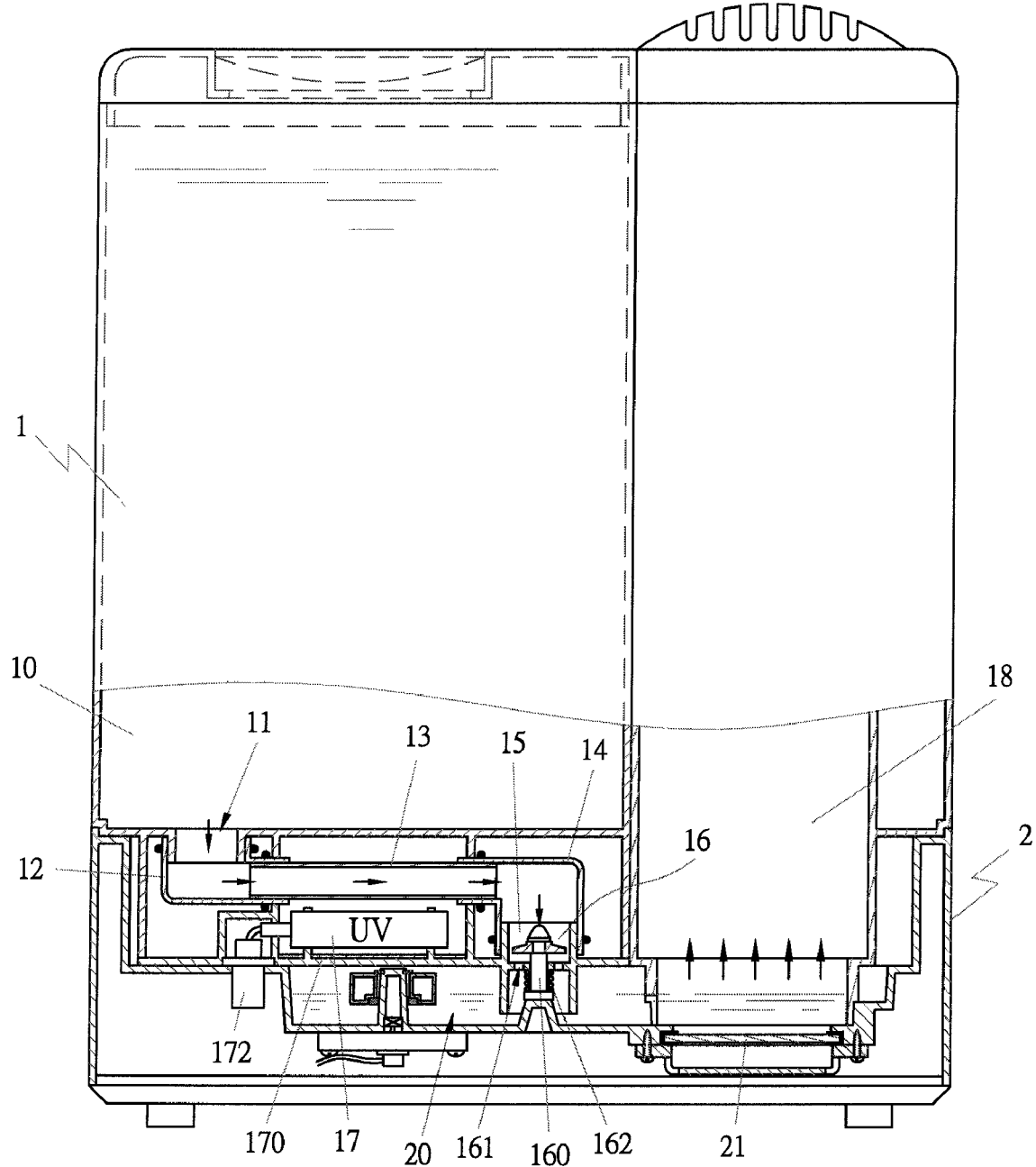
FIG. 3 is a partial cross-sectional view of a second preferred embodiment of a UV sterilizing humidifier in the present invention.
Figure 4:
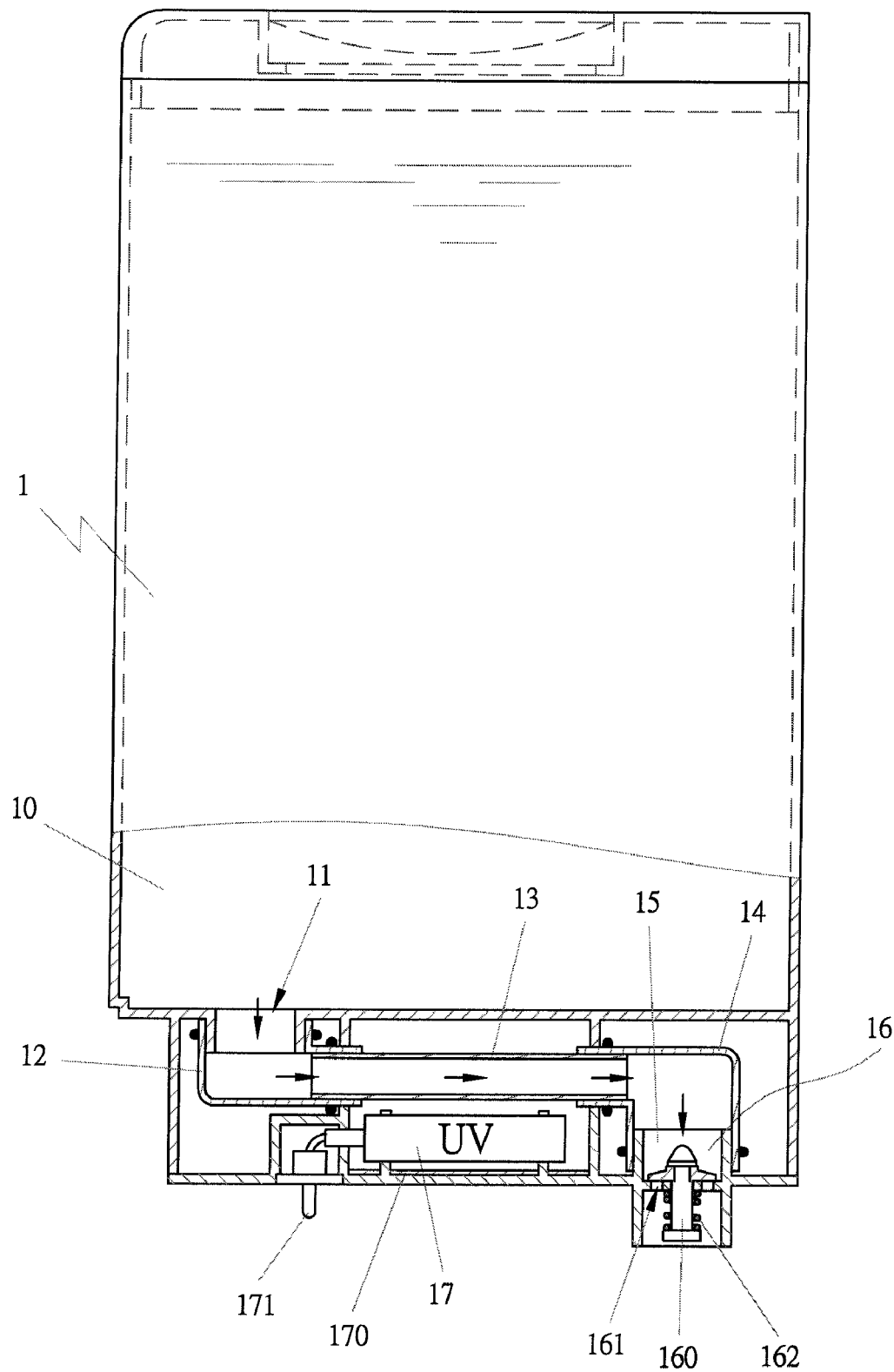
FIG. 4 is a partial cross-sectional view of the second preferred embodiment of the water box body of the UV sterilizing humidifier in the present invention.

Further, the water box body 1 has one side formed integral with an atomization chamber 18 for receiving atomized substance and smoothly conveying the atomized substance into a room. The atomization chamber 18 can also be provided separately from the water box body 1, equally having effect of receiving atomized substance and conveying it into a room, as shown in FIGS. 3 and 4 of a second preferred embodiment.

The main body 2 is provided with a water-storing tank 20 having a proper amount of water stored therein. The water-storing tank 20 is disposed with an oscillator 21 in the interior for atomizing the water therein and then the atomized substance will be conveyed into a room through the atomization chamber 18 of the water box body 1. The water-storing tank 20 of the main body 2 is further provided with a detecting element for detecting the amount of water stored in the water-storing tank 20 so as to insure safety of using the humidifier.

Thus, when the water in the water-storing box 10 flows through the glass tube and before getting into the water-storing tank of the main body, it will be compulsively sterilized by the UV sterilizing lamp 17 in the water box body 1; therefore, the atomized substance conveyed into a room becomes absolutely clean, thus attaining a comfortable, hygienic and safe living condition.

Figure 5:
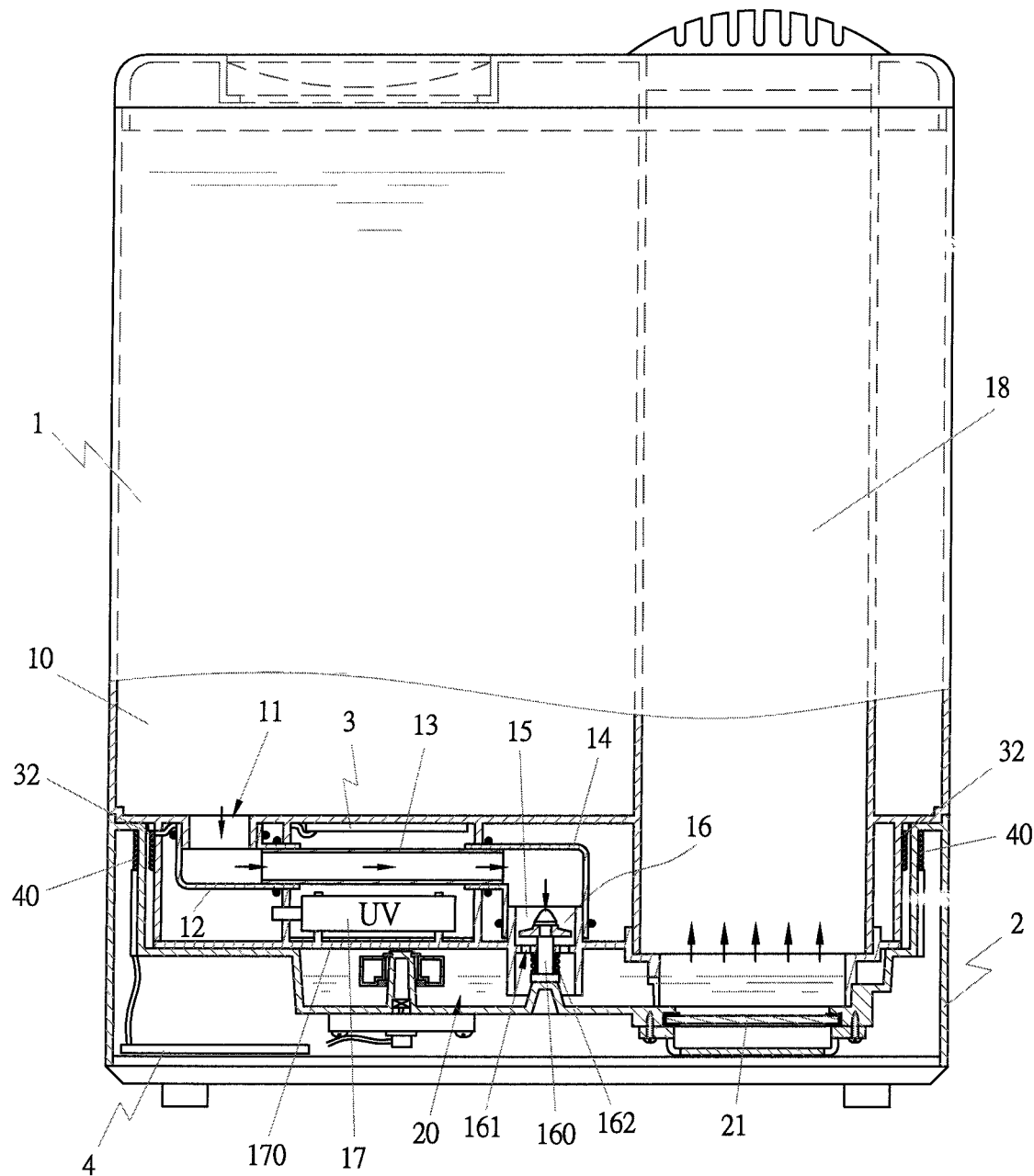
FIG. 5 is a partial cross-sectional view of a third preferred embodiment of a UV sterilizing humidifier in the present invention.
Figure 6:
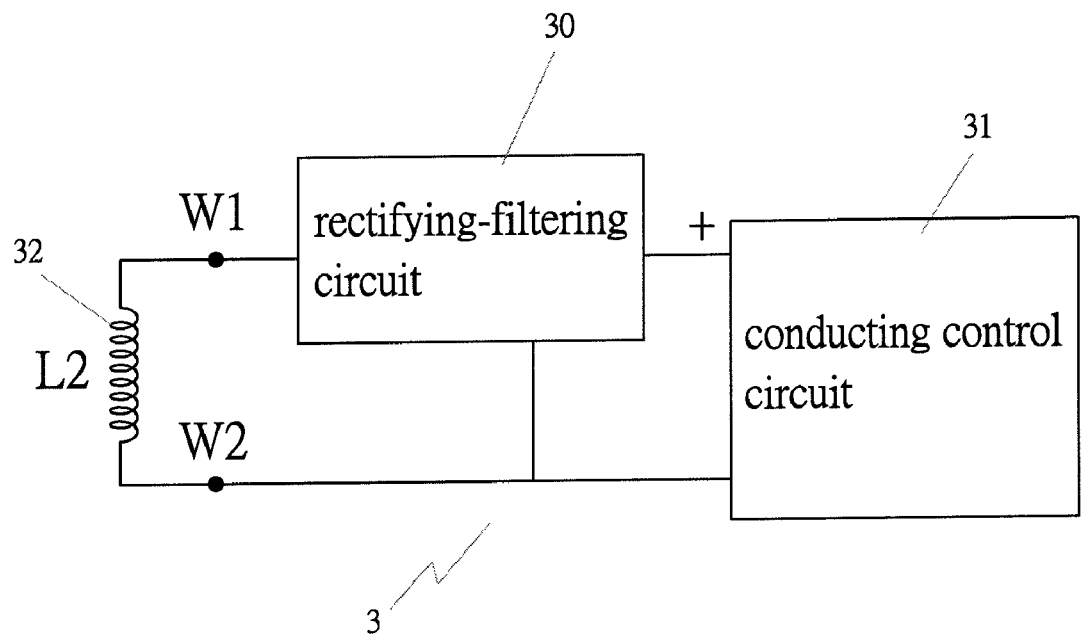
FIG. 6 is a flow chart of the third preferred embodiment of a control circuit provided in the water box body in the present invention.
Figure 7:
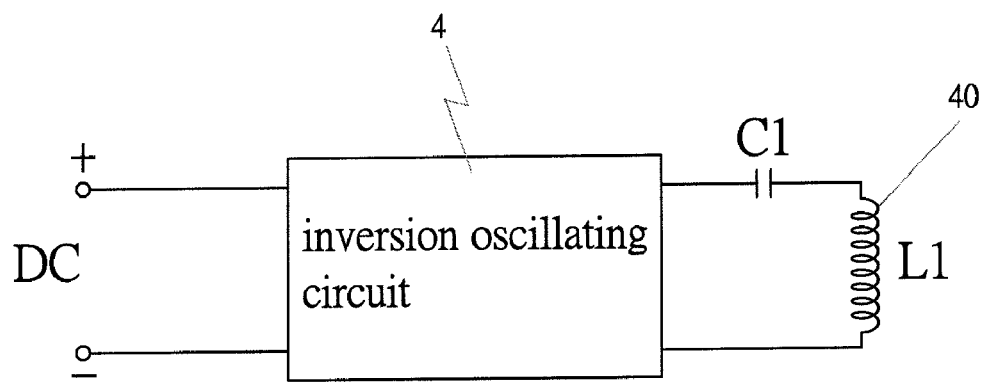
FIG. 7 is a flow chart of the third preferred embodiment of an inversion oscillating circuit provided in the main body of a UV sterilizing humidifier in the present invention.

A third preferred embodiment of a UV sterilizing humidifier in the present invention, as shown in FIGS. 5, 6 and 7, includes a water box body 1 and a main body 2 as main components combined together.

The water box body 1 is formed with a water-storing box 10 having its bottom bored with a water outlet 11 combined with a first heat-resistant tube 12 connected with one end of a UV transparent tube 13 having the other end connected with a second heat-resistant tube 14 that is connected with the inlet tube 15 of the water-storing tank of the main body 2. The inlet tube 15 formed integrally with the water box body 1 is provided with a control valve 16 having its valve rod 160 under a water inlet 161 fitted thereon with a compression elastic member 162. Thus, when the water box body 1 is separated from the main body 2, the control valve 16 will be pulled downward by the compression elastic member 162 to close the water inlet 161 for preventing water in the water-storing box 10 from leaking out.

Further, the water box body 1 is installed with a UV sterilizing lamp 17 at a location under the UV transparent tube 13, such as a glass tube. The UV sterilizing lamp 17 has its circumference except a portion matching with the UV transparent tube 13 provided with an isolating layer 170 for segregating the UV sterilizing lamp 17 from the outside in order to prevent UV light from transmitting to the external environment. Furthermore, the water box body 1 is provided with a control circuit 3 for carrying out induction and electric conduction between the UV sterilizing lamp 17 and the main body 2. The control circuit 3, as shown in FIG. 6, is disposed with a rectifying-and-filtering circuit 30, a conduction control circuit 31 and a receiving induction coil 32 that is positioned at an outer side of the water box body 1. Moreover, the water box body 1 has one side formed integral with an atomization chamber 18 for receiving atomized substance and smoothly conveying the atomized substance into a room.

The main body 2 is provided with a water-storing tank 20 stored with a proper amount of water in the interior and having an oscillator 21 installed inside for atomizing the water therein, and then the atomized substance is conveyed into a room through the atomization chamber 18 of the water box body 1. In addition, the water-storing tank 20 is disposed with a detecting element in the interior for detecting the amount of water stored therein so as to insure safety of using the humidifier, and the main body 2 is provided with an inversion oscillating circuit 4 connected with an emitting induction coil 40, as shown in FIG. 7, for matching with the control circuit 3 of the water box body 1. The emitting induction coil 40 is installed at a proper location inside the main body 2, preferably installed at a location facilitating to carry out corresponding operation with the receiving induction coil 32 of the water box body 1.

The receiving induction coil 32 of the water box body 1 functions to receive the electromagnetic field produced by the emitting induction coil 40 of the main body 2 to have its opposite ends producing voltage for triggering the control circuit 3 of the water box body 1 to operate. By so designing, when the water of the water-storing box 10 flows through the UV transparent tube 13 and before getting into the water-storing tank of the main body 2, it will be compulsively sterilized by the UV sterilizing lamp 17 inside the water box body 1; therefore, the atomized substance conveyed into a room becomes absolutely clean, achieving a comfortable, hygienic and safe living environment.

While the preferred embodiments of the invention have been described above, it will be recognized and understood that various modifications may be made therein and the appended claims are intended to cover all such modifications that may fall within the spirit and scope of the invention.

We claim:

1. A UV sterilizing humidifier comprising:
   a water box body provided with a water-storing box, said water-storing box bored with a water outlet fixed with a first tube, said first tube connected with one end of a UV transparent tube, said UV transparent tube having another end connected with a second tube, said second tube connected with an inlet tube of a water-storing tank of a main body, said water box body installed with a UV sterilizing lamp at a location under said UV transparent tube, said water box body further disposed with an atomization chamber for receiving atomized substance and smoothly conveying said atomized substance into a room; and
   the main body provided with the water-storing tank having an oscillator installed therein, said oscillator functioning to atomize water in said water-storing tank.

2. The UV sterilizing humidifier as claimed in claim 1, wherein said inlet tube of said water-storing tank is assembled with a control valve having its valve under a water inlet fitted thereon with a compression elastic member.

3. The UV sterilizing humidifier as claimed in claim 1, wherein said UV sterilizing lamp has its circumference except a portion corresponding to said UV transparent tube disposed with an isolating layer.

4. The UV sterilizing humidifier as claimed in claim 1, wherein said UV sterilizing lamp is provided with an electric conducting terminal connected with a connecting terminal of said main body for carrying out electrical connection.

5. The UV sterilizing humidifier as claimed in claim 1, wherein said UV transparent tube is a glass tube.

6. The UV sterilizing humidifier as claimed in claim 1, wherein said first tube is a silica tube.

7. The UV sterilizing humidifier as claimed in claim 1, wherein said second tube is a silica tube.

8. The UV sterilizing humidifier as claimed in claim 1, wherein said water box body is assembled with a control circuit provided with a rectifying-filtering circuit, a conduction control circuit and a receiving induction coil that is positioned at an outer side of said water box body.

9. The UV sterilizing humidifier as claimed in claim 1, wherein said main body is disposed with an inversion oscillating circuit connected with an emitting induction coil.

* * * * *